United States Patent
Lambert et al.

[11] Patent Number: 5,855,865
[45] Date of Patent: Jan. 5, 1999

[54] METHOD FOR MAKING ENCAPSULATED GAS MICROSPHERES FROM HEAT DENATURED PROTEIN IN THE ABSENCE OF OXYGEN GAS

[75] Inventors: Karel J. Lambert; Sheila Benay Podell, both of San Diego; Edward G. Jablonski, Escondido; Carl Hulle, San Diego; Kenneth Hamilton, Cardiff; Rolf Lohrmann, La Jolla, all of Calif.

[73] Assignee: Molecular Biosystems, Inc., San Diego, Calif.

[21] Appl. No.: 887,493

[22] Filed: Jul. 2, 1997

Related U.S. Application Data

[63] Continuation of Ser. No. 662,983, Jun. 13, 1996, abandoned, which is a continuation of Ser. No. 290,024, Aug. 12, 1994, abandoned, which is a continuation-in-part of Ser. No. 220,264, Mar. 30, 1994, abandoned, which is a continuation of Ser. No. 086,717, Jul. 2, 1993, abandoned.

[51] Int. Cl.$^6$ .................................................. A61B 5/055
[52] U.S. Cl. ............................................................ 424/9.52
[58] Field of Search ............................ 424/9.52; 600/431

[56] References Cited

U.S. PATENT DOCUMENTS

| | | | |
|---|---|---|---|
| 4,572,203 | 2/1986 | Feinstein | 128/661 |
| 4,774,958 | 10/1988 | Feinstein | |
| 4,832,941 | 5/1989 | Berwing et al. | 424/9 |
| 4,844,882 | 7/1989 | Widder et al. | 424/9 |
| 4,957,656 | 9/1990 | Cerny et al. | 252/311 |
| 5,147,631 | 9/1992 | Glajch et al. | 424/9 |
| 5,149,319 | 9/1992 | Unger | 604/22 |
| 5,190,982 | 3/1993 | Erbel et al. | 521/56 |
| 5,205,290 | 4/1993 | Unger | 424/9.42 |
| 5,271,928 | 12/1993 | Schneider et al. | 424/9 |
| 5,281,408 | 1/1994 | Unger | 424/9.42 |
| 5,310,540 | 5/1994 | Giddey et al. | 424/9 |
| 5,362,478 | 11/1994 | Desai et al. | 424/9 |

(List continued on next page.)

FOREIGN PATENT DOCUMENTS

| | | |
|---|---|---|
| 0 458 745 A1 | 11/1991 | European Pat. Off. . |
| 0 554 213 A1 | 8/1993 | European Pat. Off. . |
| WO92/05806 | 4/1992 | WIPO . |
| WO92/17212 | 10/1992 | WIPO . |
| WO92/17213 | 10/1992 | WIPO . |
| WO92/17514 | 10/1992 | WIPO . |
| WO93/05819 | 4/1993 | WIPO . |
| WO94/18954 | 9/1994 | WIPO . |
| WO96/09793 | 4/1996 | WIPO . |

OTHER PUBLICATIONS

L.C. Clark et al., "Response of the Rabbit Lung as a Criterion of Safety for Fluorocarbon Breathing and Blood Substitutes", *Biomaterials, Artif. Cells Immob. Biotech.* 20:1085–1099, 1992.

N. de Jong et al., "Quantification of transpulmonary echo-contrast effects", *Ultrasound Med. Biol.* 19 (4) pp.279–288, 1993.

N. de Jong et al., "Absorption and Scatter of Encapsulated Gas Filled Microspheres: Theoretical Considerations and Some Measurements", *Ultrasonics* 30:95–103, 1992.

R. Gramiak et al., "Echocardiography of the Aortic Root", *Investigative Radiology* 3:356–366, 1968.

M.W. Grinstaff et al., "Air–Filled Proteinaceous Microbubbles: Synthesis of an Echo–Contrast Agent", *Proc. Natl. Acad. Sci.* 88:7708–7710, 1991.

(List continued on next page.)

*Primary Examiner*—Gary E. Hollinden
*Attorney, Agent, or Firm*—Morrison & Foerster, LLP

[57] ABSTRACT

Elastic protein microspheres, filled with water insoluble gases, have been produced by ultrasound and mechanical cavitation without the present of oxygen. The microspheres are highly echogenic. The microspheres exhibit greatly enhanced static pressure stability, up to 40 psig. The microspheres are resistant to coalescence and to expansion due to differential gas diffusion. The microspheres are resistant to collapse when suspended in a gas-depleted aqueous solution.

7 Claims, 8 Drawing Sheets

U.S. PATENT DOCUMENTS

| | | | |
|---|---|---|---|
| 5,393,524 | 2/1995 | Quay | 424/9 |
| 5,409,688 | 4/1995 | Quay | 424/9 |
| 5,413,774 | 5/1995 | Schneider et al. | 424/9.51 |
| 5,439,686 | 8/1995 | Desai et al. | 424/451 |
| 5,456,900 | 10/1995 | Unger | 424/9.42 |
| 5,498,421 | 3/1996 | Grinstaff et al. | 424/450 |
| 5,505,932 | 4/1996 | Grinstaff et al. | 424/9.3 |
| 5,508,021 | 4/1996 | Grinstaff et al. | 424/9.322 |
| 5,512,268 | 4/1996 | Grinstaff et al. | 424/9.322 |
| 5,527,521 | 6/1996 | Unger | 424/9.42 |
| 5,529,766 | 6/1996 | Klaveness et al. | 424/9.52 |
| 5,531,980 | 7/1996 | Schneider et al. | 424/9.52 |
| 5,536,490 | 7/1996 | Klaveness et al. | 424/9.52 |
| 5,540,909 | 7/1996 | Schutt | 424/9.52 |
| 5,547,656 | 8/1996 | Unger | 424/9.42 |
| 5,556,610 | 9/1996 | Yan et al. | 424/9.52 |
| 5,558,094 | 9/1996 | Quay | 128/662.02 |
| 5,558,853 | 9/1996 | Quay | 424/9.5 |
| 5,558,854 | 9/1996 | Quay | 424/9.52 |
| 5,558,855 | 9/1996 | Quay | 424/9.5 |
| 5,573,751 | 11/1996 | Quay | 424/9.52 |

OTHER PUBLICATIONS

W.H. Lee et al., "Structural Effects on Blood Proteins at the Gas–Blood Interface", *Federation Proceedings* 30:1615–1622, 1971.

H. Lincoff et al., "The Perfluorocarbon Gases in the Treatment of Retinal Detachment", *Opthalmology* 90:546–551, 1983.

R.S. Meltzer et al., "Clinical Note: Why Do the Lungs Clear Ultrasonic Contrast?", *Ultrasound in Medicine and Biology* 6:263–269, 1980.

E.S. Munson, "Effect of Nitrous Oxide on the Pulmonary Circulation During Venous Air Embolism", *Anesth. Analg.* 50:785–793, 1971.

J. Ophir et al., "Contrast Agents in Diagnostic Ultrasound", *Ultrasound in Medicine and Biology* 15(4):319–333, 1989.

M. Pekna et al., "Evidence for iC3 Generation During Cardiopulmonary Bypass as the Result of Blood–Gas Interaction", *Clin. Exp. Immunol.* 91:404–409, 1993.

R.G. Presson et al., "Effect of Ventilation with Soluble and Diffusible Gases on the Size of Air Emboli", *J. Appl. Physiol.* 70:1068–1074, 1991.

M. Schneider et al., "Polymeric Microballoons as Ultrasound Contrast Agents: Physical and Ultrasonic Properties Compared with Sonicated Albumin", *Investigative Radiology*, 27:134–139, 1992.

K. S. Suslick et al., "Protein Microencapsulation of Nonaqueous Liquids", *J. Am. Chem. Soc.*, 112:7807–7809, 1990.

W.G. Swalbach et al., "Use of a New Gas, Sulfur Hexafluoride, SF6, in Pneumoperitoneum", *Amer. Rev. Tubercul. Pulmon. Dis.* 76:1063–1070, 1957.

J.B. Echols, "Filtration of polymer viscosified fluids" *Adv. Filtr. Sep. Tech.* ( 1990) 1:108–110.

A letter dated Feb.19, 1996, addressed to Tom Ciotti, Esq., Morrison & Foerster and signed by karel J. Lambert.

METHOD FOR MAKING ENCAPSULATED GAS MICROSPHERES FROM HEAT DENATURED PROTEIN IN THE ABSENCE OF OXYGEN GAS

CROSS-REFERENCE TO RELATED APPLICATIONS

This application is a continuation of application Ser. No. 08/662,983, filed Jun. 13, 1996, now abandoned, which application is a continuation of U.S. Ser. No. 08/290,024, filed Aug. 12, 1994, now abandoned which in turn is a continuation-in-part of U.S. Ser. No. 08/220,264, filed Mar. 30, 1994, now abandoned, which in turn is a continuation of U.S. Ser. No. 08/086,717, filed Jul. 2, 1993, now abandoned.

DESCRIPTION

1. Technical Field

This invention relates to ultrasonic imaging of the human body for diagnostic purposes; and, more particularly, to diagnostic imaging agents composed of proteinaceous microspheres encapsulating insoluble gases and methods for their use.

2. Background

Diagnostic ultrasonic imaging is based on the principle that waves of sound energy can be focused upon an area of interest and reflected in such a way as to produce an image thereof. The ultrasonic scanner utilized is placed on a body surface overlying the area to be imaged, and sound waves are directed toward that area. The scanner detects reflected sound waves and translates the data into video images. When ultrasonic energy is transmitted through a substance, the amount of energy reflected depends upon the velocity of the transmission and the acoustic properties of the substance. Changes in the substance's acoustic properties (e.g., variations in acoustic impedance) are most prominent at the interfaces of different acoustic densities, such as liquid-solid or liquid-gas. Consequently, when ultrasonic energy is directed through tissue, organ structures generate sound reflection signals for detection by the ultrasonic scanner. These signals can be intensified by the proper use of a contrast agent.

Ultrasound imaging agents of particular importance employ the use of gas because of its efficiency as a reflector of ultrasound. Resonant gas bubbles scatter sound a thousand times more efficiently than a solid particle of the same size. Ophir and Parker describe two types of gas-containing imaging agents as being: (1) free air bubbles and (2) encapsulated air bubbles (*Ultrasound in Medicine and Biology* 15(4): 319–333, 1989). However, free gas bubbles of the appropriate size are too short-lived to be effective for most in-vivo applications (Meltzer, et al., *Ultrasound in Medicine and Biology* 6: 263–269, 1980). Ophir and Parker point out that the development of encapsulated gas bubbles was an attempt to overcome this problem.

The earliest reported use of free air bubbles in ultrasound studies was by Gramiak and Shah (*Inv. Radiol.* 3: 356–366, 1968). Since then, different investigators have reported the use of atmospheric gas bubbles in ultrasonic imaging (Ophir and Parker).

Prior use of water insoluble gases in-vivo includes the therapeutic applications for the treatment of retinal detachment. Current clinical practice of retinal tamponade involves the use of a slowly diffusing, insoluble gas consisting of: sulfur hexafluoride, perfluoropropane, octafluorocyclobutane, methane tetrafluoride, perfluoroethane, or perfluorobutane. It was found that the eye, once filled with such a gas, remains so for up to several months (Lincoff et al., *Ophthalmology* 90: 546–551, 1983). Another clinical application of insoluble gases is for postpneumonectomy control of cardiopulmonary dysfunction. A relatively insoluble gas, such as sulfur hexafluoride, is used to fill the void space left following surgical resection of the lower pulmonary lobe(s) (Swalbach, W. G. et al., *Am. Rev. Tubercul. Pulmon. Dis.* 76: 1063–1070, 1957).

Recently, Quay (Quay, PCT 92/07250) has described ultrasonic imaging agents composed of free microbubbles of gases which have a specific mathematical combination of physical properties, such as high molecular weight or volume, high density and relatively low solubility. These free gas microbubbles, which may be stabilized by surfactants, are reported to have long life spans in solution.

Clinically adverse effects of free, insoluble gas bubbles have been noted. Influx of oxygen and nitrogen, dissolved in tissue and blood, greatly exceed efflux of the insoluble gas. This influx continues until the partial pressures of each gas in the bubble are in proportion to their mole fraction in solution, resulting in dramatic expansion of the bubble. In one case reported by Lincoff, intraocular injection of 1.1 mL of perfluoropropane resulted in an expanded bubble of 4.5 mL. Fivefold expansion of perfluorobutane bubbles was also noted, resulting in dangerous increases in intraocular pressure which required further clinical intervention.

Similar problems have been noted after intravenous administration of perfluorocarbon liquid emulsions. In one study, fluorocarbons with increased vapor pressure (i.e., lower boiling points) were found to cause microemboli which became trapped in the pulmonary capillary bed (Clark, L. C. et al., Biomaterials, Artif. Cells Immob. Biotech. 20: 1085–1099, 1992). The lung also became hyperdistended as the bubbles increased in size.

This phenomenon is analogous to the growth of intravascular air bubbles by ventilation with rapidly diffusing gases. As observed by Presson, (Presson, R. G. et al., *J. Appl. Physiol.* 70: 1068–1074, 1991) venous air embolism in the dog lung was exacerbated during anesthesia by influx of nitrous oxide into experimentally introduced air microbubbles. The bubbles increased in size resulting in an immediate, dramatic increase in pulmonary arterial pressure associated with pulmonary emboli (Munson, E. S., *Anesth. Analg.* 50: 785–793, 1971). A similar phenomenon may be expected with free perfluorocarbon microbubbles.

A second well-documented adverse effect of free bubbles in the bloodstream is the activation of complement, and consequent release of vasoactive compounds such as C5b-9 (Lee, W. H. and P. Hairston, *Fed. Proc.* 30: 1615–1622, 1971; Peckna, M. et al., *Clin. Exp. Immunol.* 91: 404–409, 1993). Generation of anaphylatoxin C3a is through to occur as a result of thioester bond cleavage during denaturation of C3 globulin on the surface of bubbles in contact with blood. Adverse side effects have also been reported with infusion of perfluorocarbon emulsions (Clark, L. C. et al., Biomaterials Artif. Cells Immob. Biotech. 20: 1085–1099, 1992).

The second major class of gas-containing ultrasound contrast agents described by Ophir and Parker are the encapsulated microbubbles, hereinafter referred to as "microspheres". The gas bubble is surrounded by a shell composed of a protein or other biocompatible material. Encapsulating microbubbles has allowed for the development of a potential product, ALBUNEX® (Molecular Biosystems, Inc., San Diego, Calif.) with a shelf-life suitable for commercialization. See U.S. Pat. No. 4,572,203 (hereby incorporated by reference). The creation of such a protein shell around the bubble prevents coalescence and permits storage of the microspheres (1–10 micron diameter) for 20 weeks or more without loss.

Encapsulating microbubbles also addresses the issue of size. Microspheres are superior in that they can be manufactured to be predominantly less than 8 microns in diameter, as required to pass through the pulmonary capillaries (deJong, N. et al., *Ultrasound Med. Biol.* 19: 279–288, 1993).

However, air-encapsulated microspheres, such as disclosed by Widder (U.S. Pat. No. 4,844,882, hereby incorporated by reference), have been shown to quickly lose echogenicity when subjected to pressures of 150 mm Hg, such as would be encountered during injection and circulation in vivo (deJong, N. et al., *Ultrasound Med. Biol.* 19: 279–288, 1993). Present encapsulating technology has yet to produce a material suitable as an ultrasound contrast agent that will survive long enough for in vivo for most desired applications. In fact, an agent capable of imaging the myocardial wall must withstand transient pressures pulses of at least 250 mm Hg (about 5 psig).

In an effort to solve the pressure-instability problem, recent teachings have centered on improving the shell, because, it is believed, the microsphere shells or "membranes" are too fragile or brittle under pressure, resulting in rapid collapse in vivo. Giddey (PCT/EP91/01706) stated, "because of their rigidity, the membranes cannot sustain sudden pressure variations to which the microspheres can be subjected, for instance during travel through the bloodstream, these variations or pressure being due to heart pulsations." To overcome shell rigidity, he proposed to pre-emulsify air in a protein solution containing a large percentage of a viscosifying agent (40%–80% polyols) and subject it to mechanical shear in a high speed blender. Bubbles of the appropriate size are collected and coated with a suitable surfactant to stabilize them in a soft shell.

Holmes (PCT WO 92/17213) proposed to enhance the in vivo stability of protein microspheres by strengthening the shell with biodegradable chemical crosslinking reagents.

Bichon et al. (EPA 90/810367) and Schneider et al. (*Inv. Radiol.* 27: 134–139, 1992) describe the production of porous (5 to 2000 nm pore size) polymeric "microballoons". They report in the European Patent Application that "the microporous structure of the microballoon's envelope is a factor of resiliency, i.e., the microspheres can readily accept pressure variation without breaking."

Erbel and Zotz (U.S. Pat. No. 5,190,982) describe a cross-linked polymeric microcapsule in which air is entrapped.

Some of the references heretofore described disclose the preparation of microspheres containing gases other than air. Holmes (PCT WO 92/17213) disclosed the use of "nitrogen, oxygen, hydrogen, nitrous oxide, carbon dioxide, helium, argon, sulfur hexafluoride, and low molecular weight optionally fluorinated hydrocarbons such as methane, acetylene or carbon tetrafluoride." Cerny et al. (U.S. Pat. No. 4,957,656) discloses the use of "a biocompatible gas . . . (vis., nitrogen, oxygen, carbon dioxide, etc.")

However, none of these aforementioned disclosures contain a description of the relationship between gas solubility and pressure resistance, or specifically suggests the use of encapsulated insoluble gas to overcome the pressure sensitivity of microspheres.

Pressure resistance must not be achieved at the expense of echogenicity for an ultrasound contrast agent. Obviously, solid particles are very pressure resistant, but reflect weak echoes back to the scanner. The approach suggested by Erbel, Zotz et al., and Holmes results in a very rigid shell around the gas bubble. Studies have shown that the presence of a rigid shell dampens resonance energy of the bubble and decreases backscatter (deJone, N. et al., *Ultrasonics* 30: 95–103, 1992). Also, the bubble resonance frequency is shifted to shorter wavelengths (Schneider, M. et al., *Invest. Radiol.* 27: 134–139, 1991). This shift can be a problem in clinical applications because penetration of the ultrasound pulse from the acoustic scanner is a direct function of the frequency; shorter wavelengths, ie. 7.5 to 12.5 MHz, do not penetrate tissue well. Typical frequencies for diagnostic ultrasound are 2–7.5 MHz.

Suslick reported that ultrasound-associated cavitation was suitable as a method of production of microspheres only in the presence of oxygen. In detailed studies, Suslick et al., (Proc. Natl. Acad. Sci. 88: 7708–7710, 1991; J. Am. Chem. Soc. 112: 7807–7809, 1990) reported that oxygen participates in the cavitation-induced intermolecular rearrangement of disulfide bonds needed for a stable protein shell. Suslick states "We find that microcapsule formation is strongly inhibited by the absence of $O_2$". He goes on to state, "If the reaction is run under an inert atmosphere (He, Ar or $N_2$), microcapsules are not formed." "Experimentally, high concentrations of microbubbles are synthesized only when the reaction is run under $O_2$ or air." See also U.S. Pat. No. 4,774,958.

The current invention relates to the unexpected finding that high concentrations of proteinaceous microspheres, entrapping relatively insoluble gases, can be made by ultrasound or mechanical cavitational processes without the presence of oxygen. Such microspheres, when formed in the presence of insoluble gases, exhibit surprising and greatly improved stability and elasticity to applied pressure, with better or equivalent echogenicity. The proteinaceous shell prevents coalescence and resists expansion due to diffusion of dissolved atmospheric gases from the surrounding solution.

Disclosure of the Invention

The invention is a composition for use as an ultrasonic imaging agent comprising a suspension of gas microspheres, said gas microspheres comprising at least one biologically inert gas having a solubility in water at 25° C. less than 0.01 mL/mL encapsulated by an elastic protein shell, said shell made from a heat-insolubilized filmogenic protein without addition of chemical crosslinking agents, and said microspheres exhibiting improved pressure resistance relative to comparable air-filled microspheres.

The invention also is an ultrasonic imaging agent composition comprising an aqueous suspension of microspheres of a gas encapsulated by a heat-insolubilized filmogenic protein wherein the encapsulated gas is entirely a pharmacologically acceptable water insoluble gas.

The invention is further directed to an ultrasonic imaging agent composition comprising an aqueous suspension of microspheres of perfluoropropane gas encapsulated by a heat insolubilized filmogenic protein.

The invention also relates to a method of making encapsulated gas microspheres useful as an ultrasonic imaging agent comprising subjecting a mixture of an aqueous solution of a filmogenic protein and a pharmacologically acceptable insoluble gas to ultrasonic or mechanical cavitation in the absence of oxygen or in an apparatus that is closed to the atmosphere.

Finally, the invention relates to a method to enhance the contrast of tissues and/or organs of a patient in an ultrasonic image thereof comprising: (a) injecting the inventive composition or microspheres into the patient, (b) applying ultrasonic energy to the tissue and/or organs, (c) detecting ultrasonic energy that is reflected from the tissues and/or organs, and (d) translating the reflected energy into an image.

MODES FOR CARRYING OUT THE INVENTION

Figure 1A:
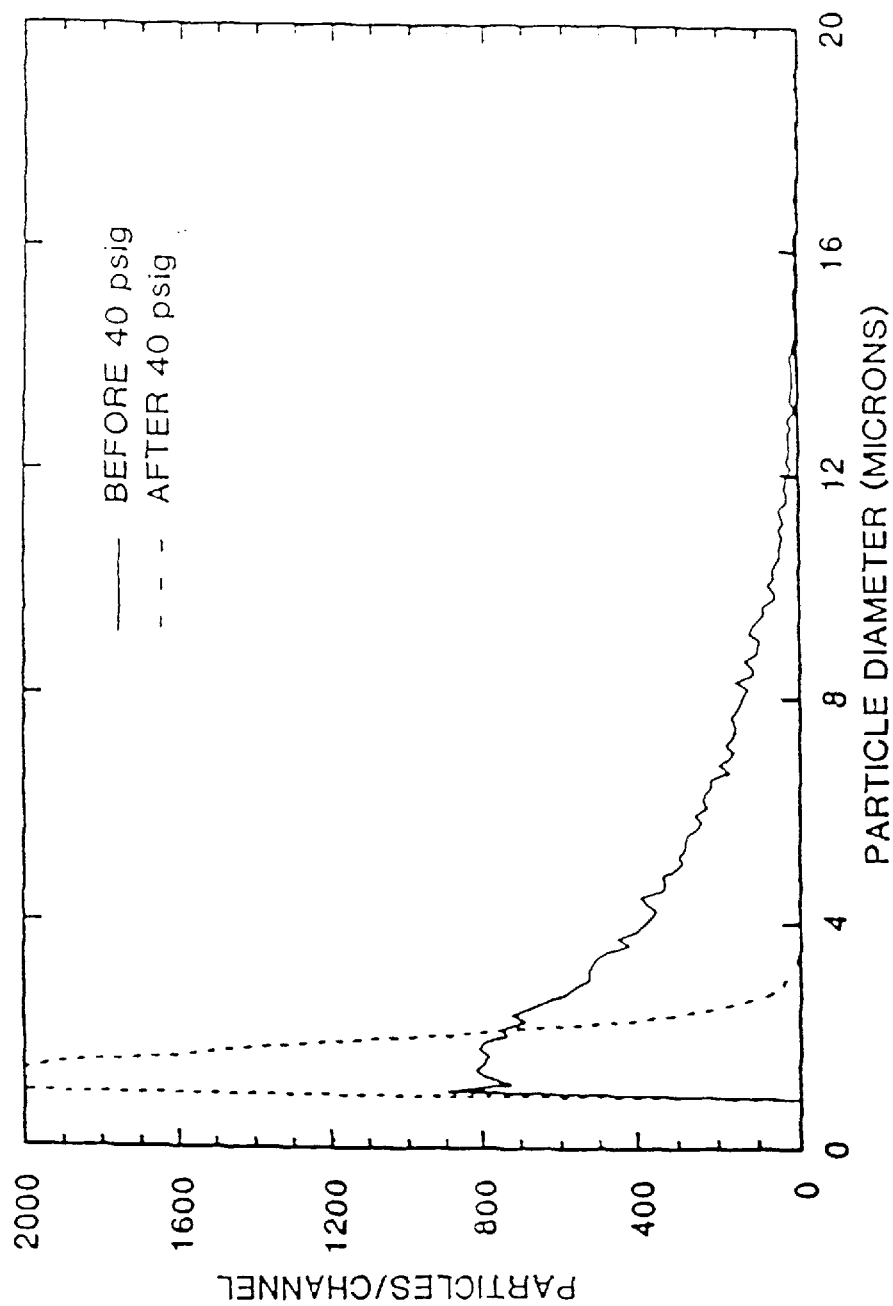
FIG. 1a shows the pressure resistance of air-filled albumin microspheres. A microsphere suspension was placed in a syringe and pressurized at 40 psig. Particle distributions before and after pressurization are shown.
Figure 1B:
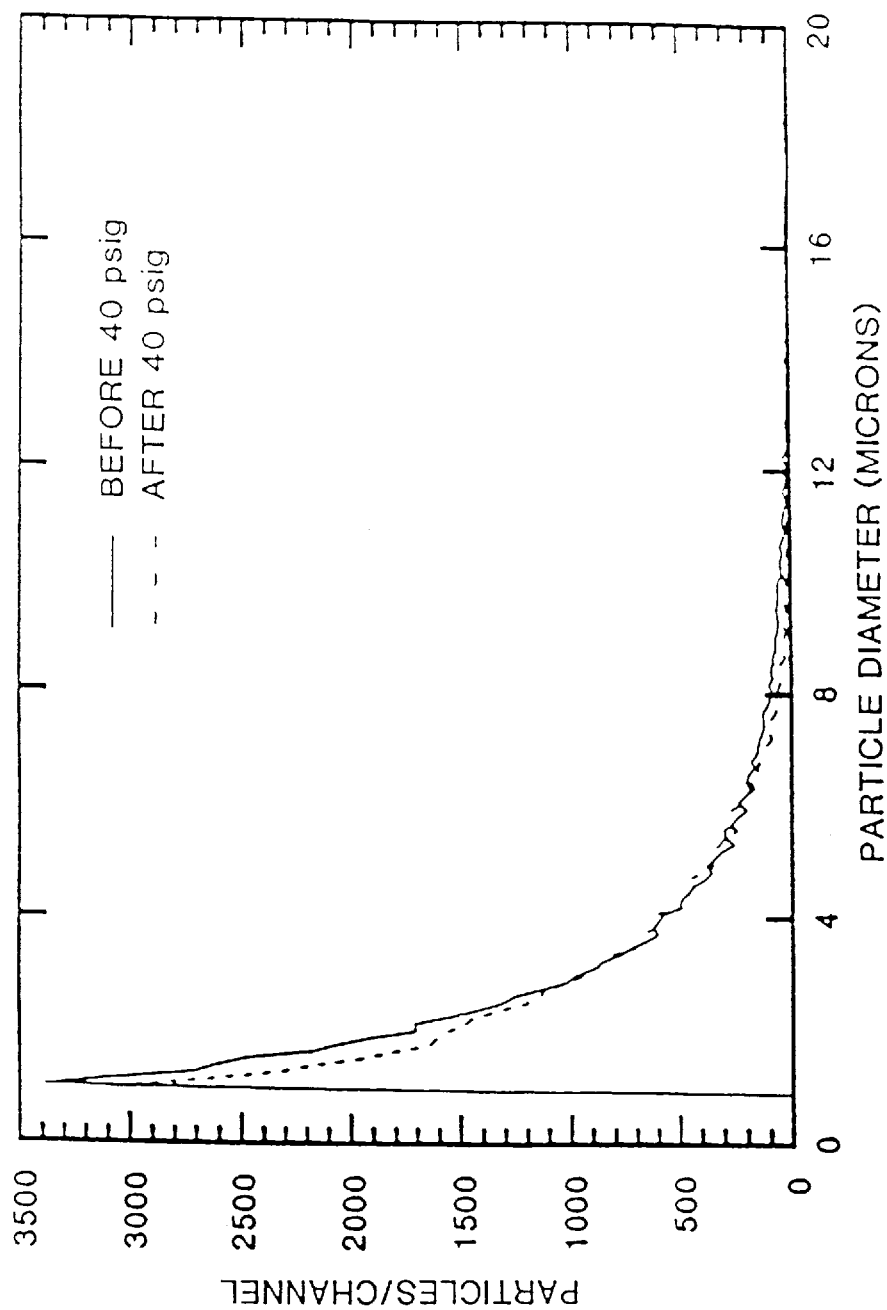
FIG. 1b shows the pressure resistance of perfluoropropane-filled albumin microspheres. A microsphere suspension was placed in a syringe and pressurized at 40 psig. Particle distributions before and after pressurization are shown.
Figure 1C:
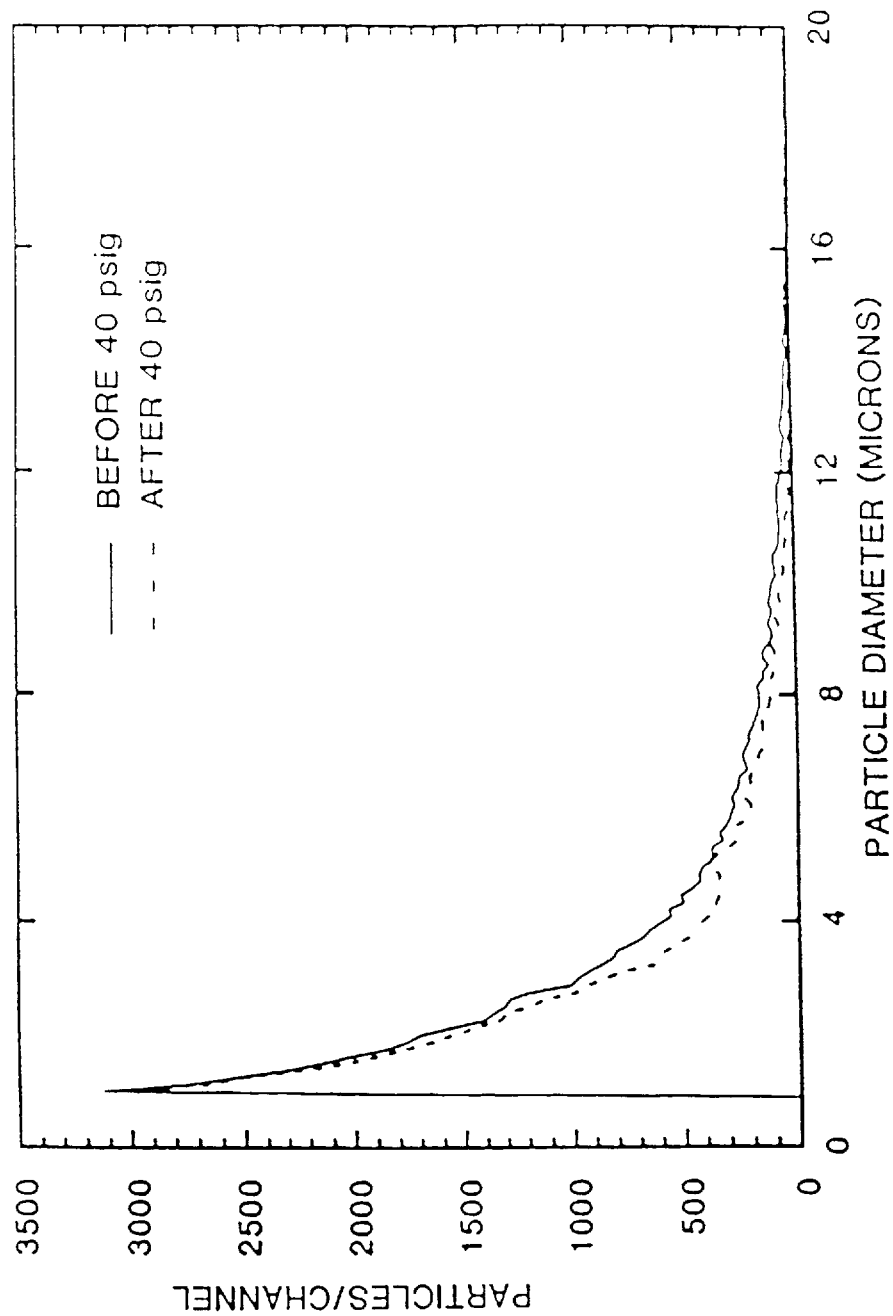
FIG. 1c shows the pressure resistance of perfluoroethane-filled albumin microspheres. A microsphere suspension was placed in a syringe and pressurized at 40 psig. Particle distributions before and after pressurization are shown.
Figure 1D:
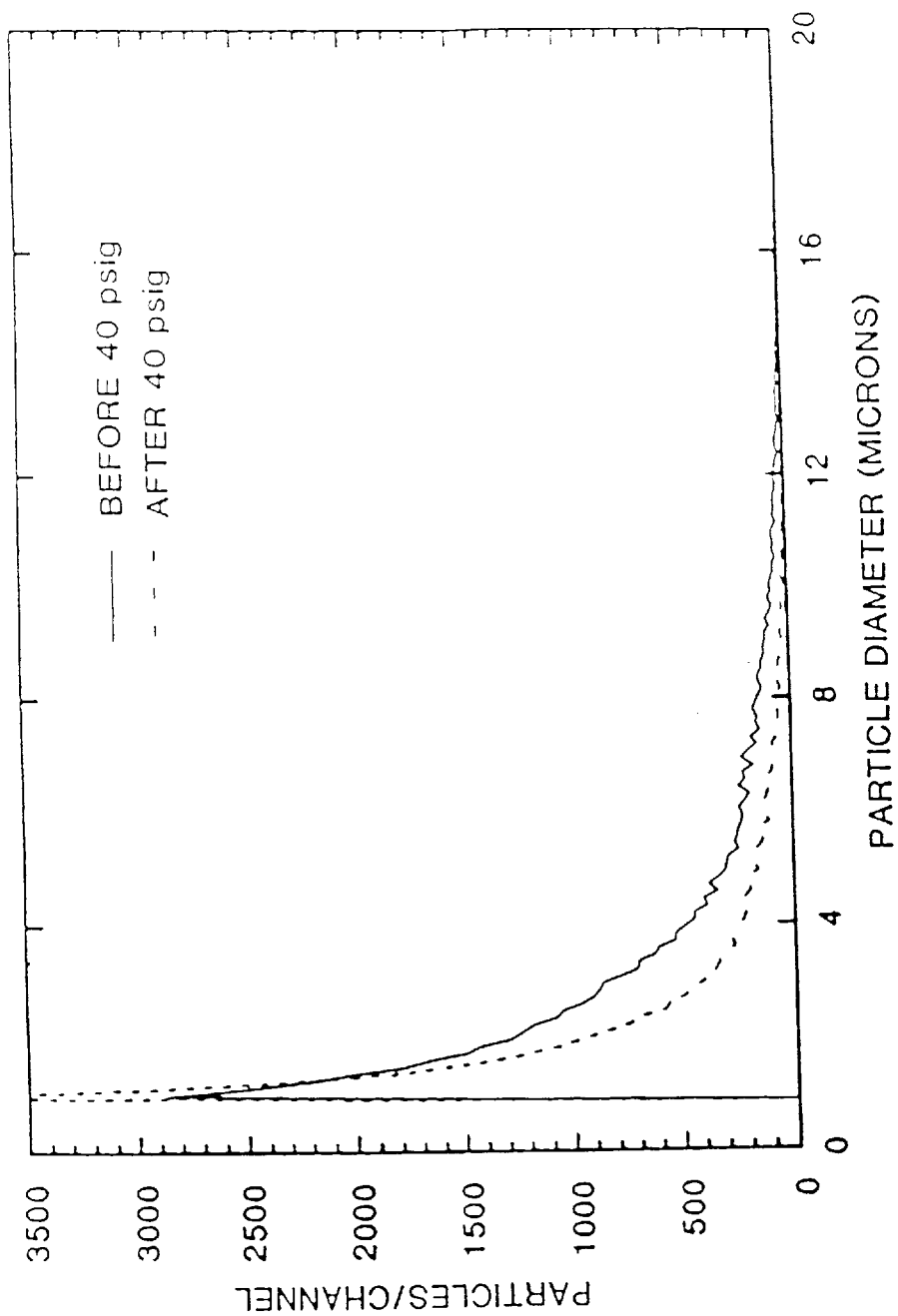
FIG. 1d shows the pressure resistance of sulfur hexafluoride-filled albumin microspheres. A microsphere suspension was placed in a syringe and pressurized at 40 psig. Particle distributions before and after pressurization are shown.
Figure 1E:
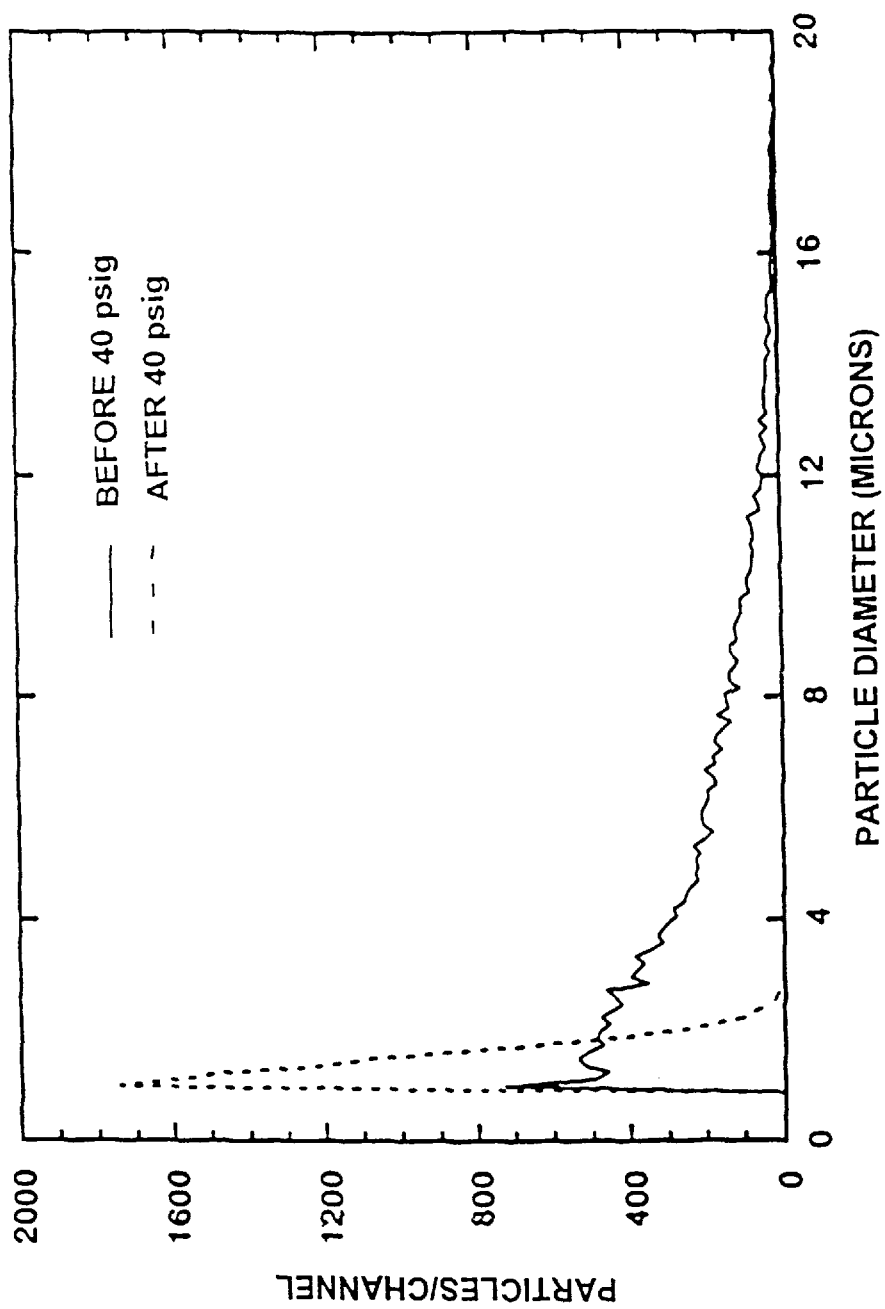
FIG. 1e shows the pressure resistance of argon-filled albumin microspheres. A microsphere suspension was placed in a syringe and pressurized at 40 psig. Particle distributions before and after pressurization are shown.

The microspheres of the present invention are formed in an aqueous suspension from the ultrasonic or mechanical cavitation of aqueous solutions of filmogenic proteins in the presence of a water insoluble gas and in the substantial absence of oxygen, i.e., under anaerobic (closed system) conditions. The microspheres are echo reflective and of a size suitable for transpulmonary passage, with a mean diameter less than 10 microns and greater than 0.1 microns. The size distribution may be altered by fractionation into larger or smaller microsphere populations. The microspheres may or may not be concentrated by removal of excess aqueous phase, or collected and resuspended in a second aqueous solution.

The gas to be used in the present invention need only be pharmacologically acceptable and insoluble in the aqueous phase of the microsphere suspension. Appropriate gases would include, but are not limited to, fluorine-containing gases such as sulfur hexafluoride, perfluoroethane, perfluoropropane, perfluoromethane, and perfluorobutane. Solubility of a gas can be defined by determining the Bunsen Coefficient of the gas of interest. This value is the volume of gas which is absorbed by a unit volume of solvent. (see Wen, W-Y, Muccitelli, J A, J. Sol. Chem. 8: 225–240 (1979)). Gases suitable for use in the present invention should have a Bunsen Coefficient in water at 25° C. of less than 0.01 mL/mL of solution. Table 1 gives the Bunsen Coefficients of several gases.

TABLE 1

| BUNSEN COEFFICIENTS OF GASES IN WATER (1 atmosphere, mL/mL) | | |
|---|---|---|
| Gas | 5° C. | 25° C. |
| Carbon Dioxide | 1.383 | 0.824 |
| Argon | 0.047 | 0.033 |
| Oxygen | 0.043 | 0.031 |
| Nitrogen | 0.021 | 0.016 |
| Sulfur hexafluoride | 0.008 | 0.0054 |
| Perfluoromethane | 0.0082 | 0.00504 |
| Perfluoroethane | 0.0027 | 0.00138 |
| Perfluropropane | 0.0016 | N/A |
| Perflurobutane | 0.0007 | N/A |

Additionally, another characteristic of the gas contained in the microspheres is that the diffusivity of the gas is less than $4 \times 10^{-5}$ $cm^2$/sec at 25° C. in water. It should be noted, however, that the diffusivity constant varies in different solvents and at different temperatures, but for purposes of selecting a gas, the gas should meet this criteria.

Perfluoropropane is preferred because it provides an insoluble gas that (1) will not condense at the temperatures of manufacture and use, (2) has no isomeric forms, (3) produces microspheres that exhibit excellent pressure resistance, and (4) is pharmacologically acceptable.

Pharmacologically acceptable refers to the property that the selected gas must be biocompatible and have minimal toxicity.

The gas microbubble is encapsulated by a filmogenic protein shell. The term filmogenic refers to the ability of the protein to form a shall around the entrapped gas, with hydrophilic groups oriented externally and hydrophobic groups oriented internally, upon protein insolubilization by cavitation. The protein will necessarily have both hydrophilic and hydrophobic amino acids. Suitable proteins will include naturally occurring proteins such albumin, gamma-globulin (human), apo-transferrin (human), β-lactoglobulin, urease and lysozyme, as well as synthetic amino acid polymers. Particularly well suited for the present invention is albumin, and more particularly, human albumin. The protein is present in the solution at a concentration in the range of about 0.1 to 10% w/v, preferably about 1 to 5% w/v, and most preferably about 1% w/v.

Proteins suitable for the present invention, or the resulting microspheres, may be chemically modified for the purpose of organ targeting or quenching immunogenic activity (e.g., modification with polyethylene glycol). However, the present invention does not involve addition of chemical crosslinking agents, or additional modifications to the proteins for the purpose of forming the microspheres.

The microspheres of the present invention are formed by insolubilizing portions of a protein solution as a result of cavitation in the presence of a hydrophobic (insoluble) gas, without the presence of oxygen. Such protein insolubilization is characterized primarily by local protein denaturation, which may be enhanced by the presence of the insoluble gas. The gas entrapped in microspheres made in such a closed anaerobic system will necessarily contain only the insoluble gas used for formation. Contamination by atmospheric gases can be monitored using an $O_2$ electrode to measure the presence of $O_2$ in the system effluent. In the present invention, microspheres are produced which initially contain only the insoluble gas used for formation. However, when the gas content is determined experimentally, there is a certain amount of unavoidable contamination by the atmospheric gases during the experimental procedure, thus causing the amount of resultant gas measured to be less than 100%. Accordingly, measurements of gas greater than 85% are representative of microspheres whose initial gas content was entirely insoluble gas.

After formation of the microspheres, exposure to the atmosphere should be avoided during packaging. For example, microspheres should be sealed in vials or other air-tight containers within 5 to 30 seconds from the time they exit from the closed system. Additionally, any head space in the vials should be removed and replaced with the gas used in formation during packaging. Filled with an insoluble gas, these protein microspheres exhibit remarkable stability, surviving exposure of 40 psig (>2000 mm Hg) at a concentration of about $1.0 \times 10^9$ microspheres per mL. The microspheres also exhibit elasticity in a dilute suspension, exhibiting compression under pressure of 3–10 psig, and returning to the original volume upon the release of pressure. Additional chemical cross-linking would be disadvantageous because the resultant microspheres would have too rigid a structure to exhibit enhanced pressure stability.

The microspheres of the present invention, unlike free microbubbles, are resistant to coalescence and diffusion driven expansion. Microspheres containing insoluble gas incubated in air or oxygen saturated solution, at various temperatures, do not increase in mean diameter or increase in total volume. The protein shell, although elastic when subjected to pressure, is strong enough to resist expansion or tearing by gas diffusion or exchange. The presence of the protein shell prevents coalescence, and maintains the gas in small, individual bubbles for up to several months, similar to air-filled protein microspheres. The inability of insoluble gas-filled microspheres to measurably expand by exchange with solvated atmospheric gases is a novel and key property for the use of this material as an ultrasound contrast agent.

Insoluble gas-entrapped protein microspheres exhibit resistance to collapse upon exposure to degassed aqueous solutions. Unlike free microbubbles or encapsulated microspheres filled with air, insoluble gas-filled microspheres may be added to vacuum degassed water and maintain integrity at high dilution. Air-filled material collapses in blood due to the efflux of the oxygen component of the gas phase. The ability of microspheres filled with an insoluble gas to resist collapse in a partially degassed or pressurized environment increases dramatically the duration of ultrasound contrast in vivo.

The microspheres of the present invention can be produced by ultrasound or mechanical cavitation. A process of ultrasound production of air-filled microspheres has been described by Cerny (U.S. Pat. No. 4,957,656, hereby incorporated by reference). An alternative method of cavitation is the use of a colloid mill to produce microspheres by mechanical cavitation.

In the mechanical cavitation procedure, the aqueous solution of heat-denaturable protein is provided to the mill at a temperature necessary to achieve incipient denaturation temperature during the subsequent mechanical emulsification of the solution. The denaturation temperature of the protein in solution will normally be in the range of 50° to 100° C. It can be obtained from tables of thermal protein denaturation in the literature, or experimentally by any known method. For example, to determine the denaturation temperature experimentally, a protein solution can be heated in a water bath while stirring. The denaturation temperature is the temperature at which insoluble material is first observed. Note that the denaturation temperature is affected by the nature, purity and source of the protein, the concentration of protein in the solution, the pH, buffer, ionic strength, the presence of stabilizers and the presence of chemical denaturants or detergents. Therefore, it is necessary to determine the denaturation temperature of the protein in the environment in which it will be employed to make microspheres. If desired, additives such as detergents or polar solvents can be employed to change the temperature at which denaturation takes place.

The following table gives the denaturation temperatures of several naturally occurring proteins which were determined experimentally as described above:

TABLE 2

| PROTEIN | CONCENTRATION | pH | SOLVENT | $T_{denaturation}$ |
|---|---|---|---|---|
| Human Serum Albumin, USP Swiss Red Cross (Bern, Switzerland) | 50 mg/mL | 6.9 | 0.9% NaCl, 4 mM Sodium Caprylate, 4 mM Tryptophanate | 75° C. |
| Human Serum Albumin, USP Swiss Red Cross (Bern, Switzerland | 10 mg/mL | 6.9 | 0.9% NaCl, 1 mM Sodium Caprylate, 1 mM Tryptophanate | 78° C. |
| β-Lactoglobulin, Sigma (St. Louis, MO) | 25 mg/mL | 7.6 | USP Water | 90° C. |
| αβ-Globin, Sigma (St. Louis, MO) | 25 mg/mL | 5.0 | USP Water | 90° C. |
| Lysozyme Sigma (St. Louis, MO) | 100 mg/mL | 7.5 | 5 mM TRIS*, 2 mM DTT*** | 31° C. as determined immediately after addition of DTT |
| Human Gamma Globulin, acid pH method, Sigma (St. Louis, MO) | 40 mg/mL | 5.0 | 10 mM MES**, pH 5.0 | 66° C. |
| Human Gamma Globulin, alkaline pH method, Sigma (St. Louis, MO) | 40 mg/mL | 9.8 | 10 mM TRIS, pH 9.8 | 69° C. |
| apo-Transferrin, Sigma (St. Louis, MO) | 20 mg/mL | 7.5 | 10 mM TRIS* | 71° C. |

*TRIS = 2-amino-2-(hydroxymethyl)-1,3-propanediol
**MES = 2-(N-morpholino)ethanesulfonic acid
***DTT = dithiothreitol Each apparatus employed to shear the protein solution/gas mixture will cause a certain amount of additional heating of the protein solution due to the mechanical shear forces exerted on the solution. That heat must be sufficient to cause localized denaturation of the protein at the gas-liquid interface. It is thus important to determine the amount of temperature increase caused by the apparatus so that the temperature at which the protein solution is introduced into the apparatus can be adjusted to achieve such local thermal denaturation. Specifically, the bulk temperature of the liquid in the apparatus must coincide with the incipient denaturation temperature immediately prior to cavitation. The cavitation event generates the additional heat necessary to locally denature the protein. Incipient denaturation temperature is defined as the temperature at which the protein is on the verge of denaturation, but the solution does not contain any denatured protein. This temperature is just below, typically 1° to 5° C. below, the denaturation temperature. If necessary, the starting protein solution may be preheated prior to being introduced into the apparatus to a temperature that allows the incipient denaturation temperature to be reached.

Once the proper starting temperature of the protein solution has been achieved, the solution is combined with a suitable gas, for example by introducing the gas into the protein solution prior to or during the emulsification step at a volume to volume ratio in the range of about 5% to 200% gas:liquid, preferably about 20% to 100%. The proper gas:liquid ratio will depend on the geometry of the apparatus, the physical characteristics of the gas (solubility, density, molecular weight, etc.), and can be adjusted to optimize output.

After the gas and protein solution are combined, the mixture is emulsified and subjected to cavitation under conditions that produce microspheres. This is accomplished using an apparatus in which mechanical shearing and hydrodynamic cavitation can be produced, such as high speed mixers, mills, fluidizers and the like. A preferred apparatus is a colloid mill which is defined as "a machine consisting of a high-speed rotor and a stator, dispersion or emulsification being effected by the opposing faces." Advanced Filtration and Separation Technology, p.108–110. Examples of specific milling apparatuses which can be used are as follows:

| | |
|---|---|
| Model #2 1/2 | Bematek, Beverly, MA |
| Model W250V | Greerco, Hudson, NH |
| Model 2F | APV Gaulin, Everett, MA |
| Model L4R | Silverson, Chesham, UK |
| Model Polytron PT3000 | Kinematica, Littaw, Switzerland |

After passing through the mill the product may be cooled, typically to 10°–20° C., and defoamed by settling or by adding biocompatible defoaming agents that do not adversely affect the microspheres.

Passing the mixture through such a mill or equivalent device emulsifies and cavitates the mixture to form microspheres in the range of about 0.1 to 10 microns (mean diameter). Microsphere size may be determined by a suitable particle counter, for example a Coulter Multisizer II (Coulter Electronics, Hialeah, Fla.).

When using a colloid mill, the rotor speed, gap size and gas:liquid ratio are the principal process parameters which affect the characteristics (mean size, size distribution, and concentration of microspheres) of the microsphere product. Those parameters are adjusted empirically to provide a product having the desired characteristics. For any given product, its characteristics are defined clinically. For instance, putative specifications for perfluoropropane microspheres used for myocardial perfusions are: mean size, 4 microns; size distribution, 90% under 10 microns; concentration, $7 \times 10^8$ to $2 \times 10^9$ microspheres/mL.

The invention is further illustrated by the following examples. These examples are not intended to limit the invention in any manner.

EXAMPLE 1

Mechanical Cavitation Process Temperature Monitoring and Control for Human Serum Albumin As described above, the protein solution is pre-heated before processing so that the process temperature can reach and maintain the incipient denaturation temperature.

A typical method of practice is as follows:

A Model 2½" Bematek Colloid Mill (Bematek Systems, Beverly Mass.), was piped so that the inlet port was connected to a heat exchanger. Gas impermeable tubing was used to make the soft connections between the heat exchanger hose barbs.

The outlet port from the process head was connected to a stainless steel post-process chiller.

Solution temperature was monitored at three sites (T1, T2 and T3). The T1 thermocouple was mounted in a Swagelok "Tee" between the pre-heat heat exchanger and the mill head to measure the feed temperature of the protein solution. A second "Tee" for introducing gas was also placed at the feed port. The T2 thermocouple was placed inside the exit from the process head, approximately 1 cm from the rotor and 2 cm from the shaft so that the temperature of the process could be accurately measured. In this way, the two temperatures can be measured independently, the feed temperature (T1) and the process temperature, (T2), and compared to determine the amount of heating of the solution during processing.

For this example, U.S.P. albumin was diluted with normal saline to make up a 1% (w/v) solution. The denaturation temperature was determined experimentally, as described, to be 78° C. It was fed into the mill at 200 mL/min following degassing along with perfluoropropane at 100 mL/min (50% v/v). Differences between T1 and T2 of 10° to 15° C. were noted. In order to obtain a process temperature of 77° C. (1° C. below denaturation temperature), the feed temperature was adjusted to a range of 62° to 67° C. Since the amount of heat generated will vary with different milling parameters, it is necessary to determine the difference between T1 and T2 with each change in milling parameters, (choice of mill, mill settings, flow rate, gas:liquid ratio, etc.) in order to target the process temperature to avoid bulk denaturation of the protein while successfully encapsulating the gas microbubbles with a thin shell of denatured protein.

The chiller-out temperature (T3) was also monitored, and for best results was targeted at 20° C.

EXAMPLE 2

Mechanical Cavitation Method of Making Microspheres Containing Different Gases

Microspheres containing various gases were produced as follows: 5% human albumin solution (USP) was deaerated under continuous vacuum for two hours. The vacuum was released by filling the evacuated vessel with the gas of interest. Insoluble gases utilized include sulfur hexafluoride, perfluoroethane, and perfluoropropane. Microspheres containing more soluble gases, air, nitrogen, oxygen and argon, were also produced. The use of argon was representative of a high molecular weight, but relatively soluble, gas. The albumin solution was adjusted to 68° C. via an in-line heat exchanger and pumped at 100 mL/min into a 2½" colloid mill (Greerco, Hudson, N.H., model W250V or A F Gaulin, Everett, Mass., model 2F). The specific gas, at room temperature, was added to the liquid feed just upstream of the inlet port at a flow rate of 120–220 mL/min. The gap between the rotor and the stator was adjusted to $\frac{2}{1000}$th inch (0.005 cm) and the albumin solution was milled continuously at about 7000 rpm at a process temperature of 73° C.

The dense white solution of microspheres thus formed was immediately chilled to a temperature of 10° C. by a heat exchanger, and collected in glass vials. The vials were immediately sealed. The material was characterized with regard to concentration and size distribution using a Coulter Counter. The results are shown in Table 3 below.

TABLE 3

|  | Concentration ($\mu$spheres/mL) | Mean Size (microns) |
| --- | --- | --- |
| Perfluoropropane | $8.3 \times 10^8$ | 3.8 |
| Perfluoroethane | $10.6 \times 10^8$ | 4.0 |
| Sulfur hexafluoride | $8.4 \times 10^8$ | 3.9 |
| Air | $9.2 \times 10^7$ | 3.4 |
| Nitrogen | $5.4 \times 10^7$ | 5.0 |
| Oxygen | $6.1 \times 10^7$ | 3.9 |
| Argon | $4.1 \times 10^7$ | 3.5 |

EXAMPLE 3

Effect of Rotor Speed and Gap Size

A 1% albumin solution was combined (200 mL/min) with perfluoropropane (100 mL/min) at a 50% gas to liquid (v/v) ratio. Microspheres were prepared according to the procedure described in Example 1 using varying rotor speeds and gap sizes. The data obtained are shown in Table 4.

TABLE 4

| Rotor Tip Speed (ft/min) | Gap (cm) | Concentration ($\mu$spheres/mL) | Mean Size (microns) |
| --- | --- | --- | --- |
| 3500 | 0.01 | $0.76 \times 10^8$ | 13.4 |
| 4300 | 0.01 | $2.43 \times 10^8$ | 9.6 |
| 4800 | 0.01 | $9.38 \times 10^8$ | 3.8 |
| 9700 | 0.01 | $20.96 \times 10^8$ | 4.3 |
| 5200 | 0.02 | $12.87 \times 10^8$ | 5.0 |
| 7000 | 0.02 | $12.50 \times 10^8$ | 3.4 |
| 8700 | 0.02 | $14.42 \times 10^8$ | 3.0 |
| 9600 | 0.02 | $15.22 \times 10^8$ | 2.9 |

These results show that concentration increases and mean size decreases with increasing rotor speed while increasing gap size decreases concentration.

EXAMPLE 4

Effect of Gas to Liquid Ratio

A 0.5% Albumin solution (100 mL/min) was combined with perfluoropropane at 20, 50, 70 or 100 mL/min (20, 50, 70 or 100% gas to liquid v/v) using a Gaulin mill with an approximate gap of 0.012 and a rotor tip speed of 9950 ft/min. The data obtained are shown in Table 5:

TABLE 5

| Gas/Liquid % (v/v) | Gap (cm) | Concentration ($\mu$spheres/mL) | Mean Size (microns) |
| --- | --- | --- | --- |
| 20 | 0.03 | $6.54 \times 10^8$ | 3.6 |
| 50 | 0.03 | $7.51 \times 10^8$ | 4.3 |
| 70 | 0.03 | $8.76 \times 10^8$ | 5.0 |
| 100 | 0.03 | $8.66 \times 10^8$ | 5.9 |

These results show that both concentration and mean size increase with an increase in gas:liquid ratio.

EXAMPLE 5

Method of Making Insoluble Gas-Filled Microspheres by Sonic Cavitation

Air, sulfur hexafluoride and perfluoroethane microspheres were prepared by both batch and continuous ultrasound cavitation processes. A solution of human albumin, 5%, USP, was degassed under vacuum and stored under the specific gas. The continuous sonication process was performed as described by Cerny (U.S. Pat. No. 4,957,656), substituting the insoluble gases for air. The batch process was performed utilizing a ¾" liquid processing horn (Sonics and Materials, Danbury Conn.). Gas was passed through the horn and into the albumin such that during the entire process air was excluded. The albumin was warmed to 73° C. and sonicated for 5 sec at 20 KHz at 60 microns double amplitude, using a Branson piezoelectric converter and power source (Branson Ultrasonics, Danbury Conn.). The product was immediately transferred to a glass vial and sealed under gas.

The product consisted of a thick, milky suspension of microspheres at concentrations of $1.4 \times 10^8$ to $1.0 \times 10^9$ microspheres/mL with a mean size of 2.5 to 3.3 microns.

EXAMPLE 6

Microscopic Examination of Microspheres

Albumin microspheres containing various gases were prepared as described in Example 2 or 5. Microscopic examination of the products revealed a monodisperse suspension of spherical microspheres. The microspheres were collapsed by application of high pressure in a syringe until the suspension clarified. In all cases, microscopic reexamination revealed the presence of hyaline, membranous shells from the collapsed microspheres.

EXAMPLE 7

Pressure Resistance of Microspheres

Albumin microspheres containing various gases were prepared as described in Example 2. Ten mL of each suspension was placed in a 10 mL glass gas-tight syringe (Hamilton, Reno Nev.) fitted with a pressure gauge. All headspace was removed and the apparatus was sealed. A constant pressure of 40 psig was applied for 3 min. A Coulter Counter was then used to measure the sample particle concentration and distribution. Comparisons of the data (FIGS. 1a–1e) before and after pressurization demonstrated a relative resistance of the insoluble gas microspheres to 40 psig.

EXAMPLE 8

Pressure Resistance of Dilute Suspensions of Microspheres

Figure 2:
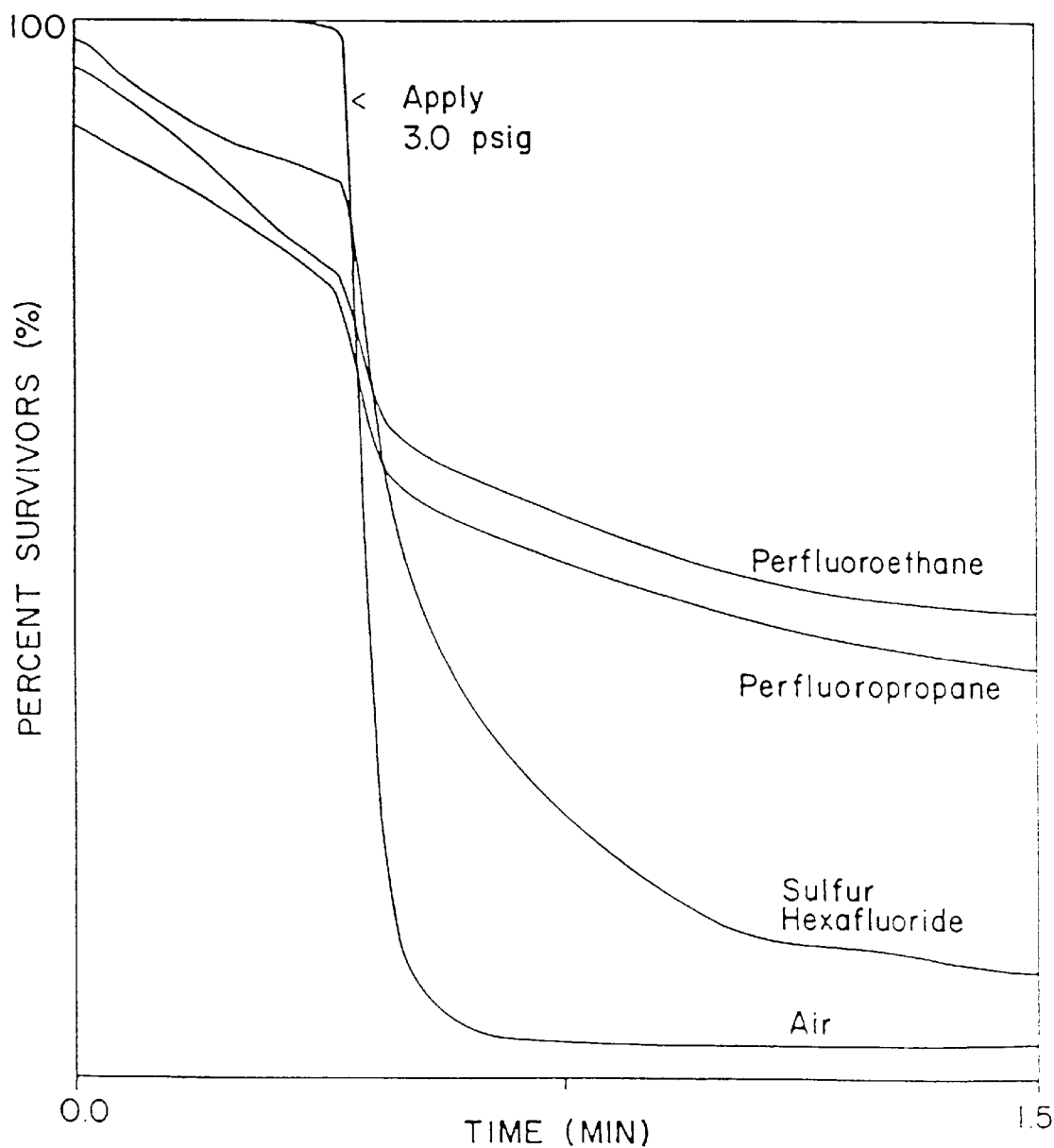
FIG. 2 shows the pressure resistance of dilute suspensions of microspheres at 3.0 psig. A diluted suspension of microspheres were placed in a 1 cm cuvette and subjected to 3.0 psig at the time t=30 seconds. Shown are data for perfluoroethane, perfluoropropane, sulfur hexafluoride and air microspheres.
Figure 3:
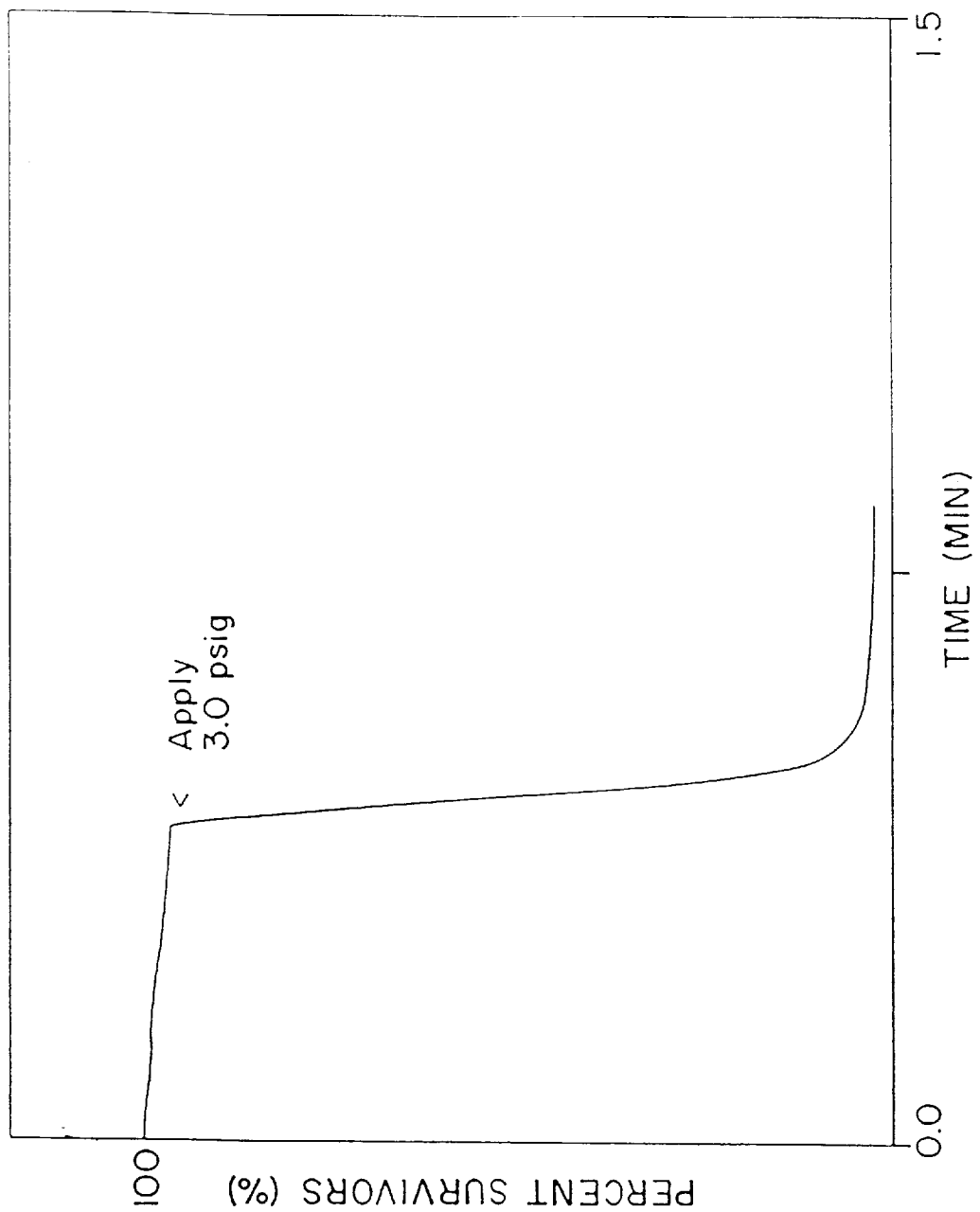
FIG. 3 shows pressure resistance of dilute suspension of argon microspheres at 3.0 psig. Diluted argon microspheres were placed in a 1 cm cuvette and subjected to 3.0 psig at time t=30 seconds.

Microspheres containing various gases were prepared as described in Example 2. Each sample of microspheres was diluted to an equal volume of encapsulated gas per mL of phosphate-buffered saline (0.15M), about a 1:60 dilution. The diluted suspension was subjected to instant static pressures of 0.5 psig to 7.5 psig in a sealed vessel with adequate head space. FIG. 2 shows the effect of pressure on microsphere concentration. Microspheres containing the insoluble gases perfluoropropane, perfluoroethane and sulfur hexafluoride are much more pressure-resistant than air or high molecular weight argon-filled microspheres of the same concentration and size distributions (FIG. 3). Physiological pressures in the bloodstream range from a peripheral venous pressure of 1.5 psig to 2.5 psig in the myocardial wall.

EXAMPLE 9

Effect of Degassed Buffer on Microspheres

Figure 4:
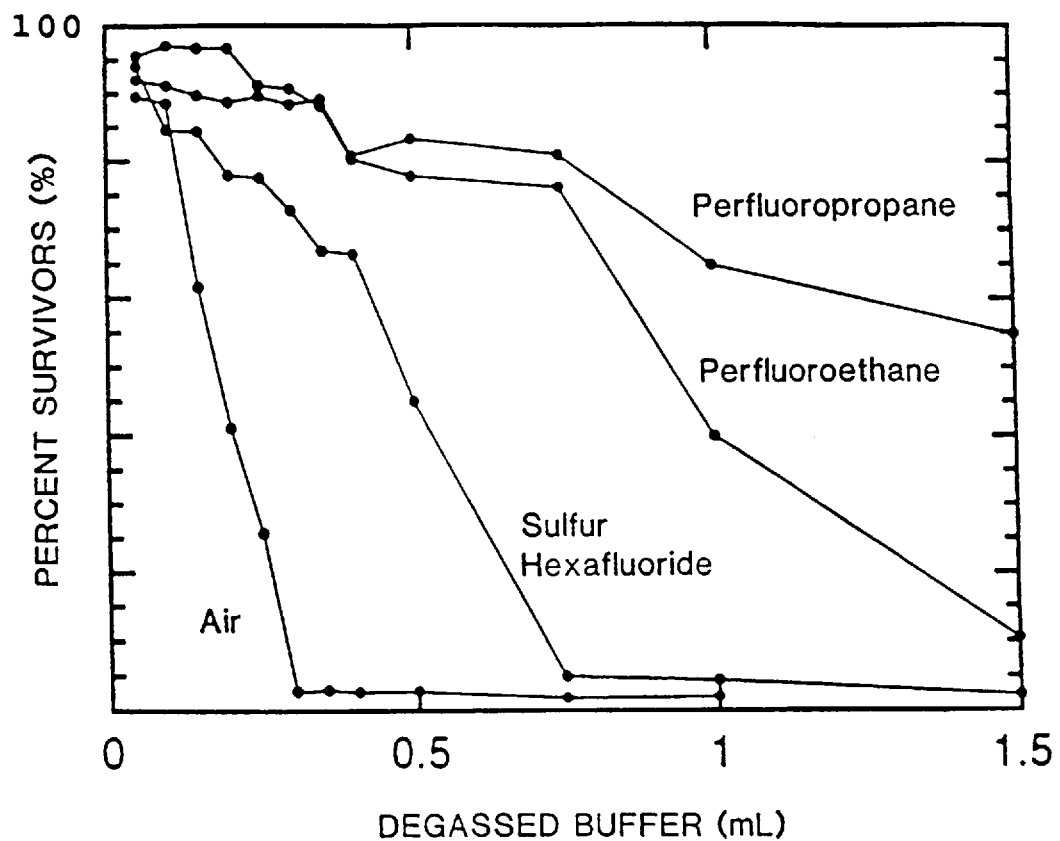
FIG. 4 shows effect of degassed buffer on microspheres. Microspheres were added to increasing amounts of degassed buffer, with mixing, and the mixture brought to constant volume for determination of concentration. Data for air, perfluoropropane, perfluoroethane, and sulfur hexafluoride microspheres are plotted versus volume of degassed buffer.

Albumin microspheres containing various gases were prepared as described in Example 2. Phosphate-buffered saline (PBS) was degassed by boiling just before use. 0.05 mL to 1.5 mL aliquots of the hot buffer were placed in 13×100 test tubes and allowed to cool 1 min to room temperature in a water bath. A constant volume of microspheres was added to each tube. After mixing, the final volume was brought to 3.0 mL with PBS and the microsphere concentration was determined. FIG. 4 shows that improved survival in degassed solutions is obtained for the microspheres containing the insoluble gases perfluoropropane, perfluoroethane and sulfur hexafluoride.

Microspheres containing air, sulfur hexafluoride or perfluoroethane were diluted into whole blood. Air-filled microspheres exhibited collapse. The insoluble gas-filled microspheres were shown to survive dilution in fresh whole blood.

EXAMPLE 10

Elasticity

Microspheres prepared from various gases were prepared as described in Example 2. Microspheres were diluted into phosphate-buffered saline, as described in Example 8, and placed in a clear cell positioned on the stage of a microscope. The cell was connected to a nitrogen source that allowed for observing the effects of rapid application and release of physiological pressures on the microspheres.

The application of 1.5 psig or greater to the soluble gas containing microspheres resulted in observing the complete loss of spherical bodies. The microspheres did not reform upon the release of the pressure, indicating irreversible destruction. The application of less than 1.5 psig resulted in deformation and wrinkling of the shell with incomplete loss of microspheres. The spherical appearance or population could not be restored upon release of the applied pressure.

The application of pressure up to several psig to a suspension of microspheres containing the insoluble perfluorocarbon gases resulted in a reduction of the diameter of the microspheres. The diameter of the microspheres returned to the original dimensions upon the release of the pressure.

Sulfur hexafluoride microspheres also exhibited enhanced elasticity under applied physiological pressure relative to air-filled microspheres, but less elasticity relative to the perfluorocarbon microspheres.

These observations indicate that the microspheres containing insoluble gases were not only resistant to pressure, but recovered after pressure was released. This is indicative of an elastic protein shell.

EXAMPLE 11

Comparison of Microspheres Made in an Open System and in a Closed System

PROCESS METHODS
A) Manual Sonication: Open System (Equivalent to EPA 554,213 One-Step Method)

The method described in U.S. Pat. No. 4,844,882 and European Patent Application 554,213 was used to prepare microspheres as follows:

A 20 cc syringe barrel was fitted with a T-type thermocouple inserted through the tip and mounted onto a support stand. The syringe was filled to the 16 cc mark with Swiss Red Cross 5% human serum albumin. Gas (perfluoropropane ($C_3F_8$) or sulfur hexafluoride ($SF_6$)) was introduced into the top of the syringe barrel and flowed over the surface of the liquid. A sonicating horn was lowered to the 10 cc mark, below the surface of the solution, and operated at 50% power until the temperature of the solution rose to 72.8°–73° C.; approximately 1 minute. The horn was immediately withdrawn to the meniscus ±1 mm and the power level increased to 65%. Sonication continued for 5 seconds, with an additional temperature increase of 1.2°–20° C. The product was poured into a glass vial to capacity and sealed.

B) Continuous Sonication: Closed System

The method described in U.S. Pat. No. 4,957,656 was used to prepare perfluoropropane and sulfur hexafluoride microspheres as follows:

Human serum albumin was diluted to a 1% w/v solution with sterile saline. The solution was heated to incipient denaturation, approximately 76° C. The system was closed to the external atmosphere and perfluoropropane or sulfur hexafluoride gas was introduced into the liquid flow (1:1) in place of air. The product was made continuously by flowing the gas/albumin mixture past the sonicator horn at approximately 100 ml liquid/min. The product was chilled upon exit from the sonication chamber by passage through a heat exchanger and collected as a bulk liquid suspension of microspheres. Handling and storage conditions were similar to that given for manually produced microspheres.

C) Mechanical Cavitation: Closed System

Albumin microspheres containing perfluoropropane or sulfur hexafluoride gas were also produced in a closed system by milling a mixture of 1% human serum albumin and gas, similar to that described in Example 2. Album in solution, heated to a temperature sufficient to allow microsphere formation by the mechanical cavitation of a given mill, was mixed 1:1 (v:v) gas and introduced into a colloid mill. The liquid flow rate was dependent upon the capacity or size of the mill, typically 100 to 500 ml/min. A Silverson L4R mill and a Bematek 3" production colloid mill were used for this evaluation. The outflow from the mill was cooled by passage through a heat exchange system and the resulting albumin microsphere suspension was collected in bulk. The product was filled into glass vials, similar to the other processes.

ANALYTICAL METHODS

A) Population Dynamics

Population dynamics were evaluated with a Coulter Multisizer II using a 50 micron aperture. Albumin microspheres prepared as described in PROCESS METHODS were diluted 1:10,000 into Isoton and a 500 $\mu$l sample was analyzed. Concentration, mean size, and encapsulated gas volume per ml of the original microsphere suspension were obtained.

B) Gas Content

The percentage of perfluoropropane entrapped in duplicate lots of microspheres prepared as described in PROCESS METHODS was determined by gas chromatography on a Hewlett Packard 5890. A sample of the microsphere suspension was taken in a gas tight syringe. The gas was released from the microspheres using an anti-foam agent in ethanol and the entrapped gas was detected by thermal conductivity.

C) Pressure Resistance

Pressure resistance of albumin microspheres was evaluated by a method similar to that reported by Sintetica in European Patent Application 554,213. Microspheres were diluted in aerated phosphate buffered saline, to approximately 1 absorbance unit at 600 nm, in a 3 ml pressure cuvette. The neck was attached to a pressure source and the cuvette placed in a recording spectrophotometer. The pressure in the cuvette was increased linearly from 0 to 5 or 10 psig over 150 seconds, at which time the pressure was released. The pressure ramp was created by a proportioning solenoid valve (Honeywell) and a pressure transducer (Omega) that were placed between a 20 psi pressure source ($N_2$ tank) and a 5 liter stainless steel reservoir. The cuvette was connected to the steel reservoir through a digital pressure gauge. A PC-type computer equipped with an analog to digital converter and a digital to analog converter board (National Instruments) controlled the opening of the valve and read the pressure transducer. The reservoir, and cuvette, was pressurized at a selected rate until the desired pressure was achieved. The optical density of the microsphere suspension was monitored as a function of time and pressure. The data was corrected for the natural flotation rate of microspheres in the cuvette.

RESULTS

A) Population Dynamics

Albumin microspheres produced by the methods of manual sonication, continuous sonication and mechanical cavitation were analyzed for concentration, mean size, encapsulated gas volume and size distribution within 24 hours after manufacture. All measurements were performed in duplicate, as a minimum, and are presented as the average. The results of these measurements are given in Table 6.

TABLE 6

| Gas | Method | Conc. ($10^8$/ml) | Mean Size ($\mu$m) | Vol (ml/ml) |
|---|---|---|---|---|
| $SF_6$ | Manual Sonication | 8.7 | 3.2 | 0.046 |
| $SF_6$ | Continuous Sonication | 12.7 | 2.7 | 0.034 |
| $SF_6$ | Mechanical Cavitation | 10.0 | 3.8 | 0.054 |
| $C_3F_8$ | Manual Sonication | 13.4 | 2.8 | 0.033 |
| $C_3F_8$ | Manual Sonication | 17.7 | 2.8 | 0.056 |
| $C_3F_8$ | Continuous Sonication | 10.1 | 3.0 | 0.050 |
| $C_3F_8$ | Continuous Sonication | 6.7 | 4.3 | 0.127 |
| $C_3F_8$ | Mechanical Cavitation (Bematek Mill) | 31.0 | 3.0 | 0.23 |
| $C_3F_8$ | Mechanical Cavitation (Silverson Mill) | 6.9 | 5.0 | 0.34 |

Microspheres produced by all methods were stable for the duration of this study, at least several weeks at 4° C.

B) Gas Content

Analyses of the composition of entrapped perfluoropropane gas in duplicate lots of microspheres are given in Table 7.

TABLE 7

| Method* | % $C_3F_8$ |
|---|---|
| Manual Sonication | 70.0 |
| Continuous Sonication | 89.5 |
| Mechanical Cavitation | 95.5 |

*Average results of duplicate lots.

These results demonstrate that microspheres made in the open system using manual sonication encapsulate much less of the gas used to form the microspheres than those made in the closed systems (continuous sonication and mechanical cavitation.) The microspheres made in the closed system were made in the absence of oxygen, as determined using an oxygen electrode. Microspheres made by all three methods were subjected to the same amount of exposure to the atmosphere during handling and sampling (which accounts for less than 100% perfluoropropane gas being measured in microspheres made using the two closed system procedures), thus there was oxygen (and other atmospheric gases) present during formation in the open system which diminished the efficiency of gas encapsulation.

C) Pressure Resistance

A suspension of gas-filled microspheres will decrease in optical density with increasing pressure due to a decrease in size and associated change in surface area. Shrinkage is due to two factors; reversible compression according to the gas laws, and irreversible loss of the gas core to the surrounding liquid due to increased solubility according to Henry's law. Upon the release of an applied pressure, only that fraction of the volume loss due to compression is recovered, and which can be observed by an increase in optical density. The loss of entrapped gas to the surrounding solution does not reenter the microspheres upon depressurization, but is lost to the head space above the solution.

The effect of imposing a linear pressure gradient up to 10 psi on 1 OD suspensions of albumin microspheres prepared with perfluoropropane gas by the manual sonication (open system) method as well as the continuous sonication and mechanical cavitation (closed system) methods was compared. Both closed system methods yielded microspheres that exhibited compression with increasing pressure, with a total recovery of volume upon release of the pressure at the end of the gradient. Loss of entrapped gas to the surrounding solution was not observed. Albumin microspheres prepared in the open system (manual sonication method) exhibited greater compression with applied pressure and only a partial recovery of volume upon release of pressure due to the irreversible loss of the gas core, resulting in a 40% destruction of microspheres.

Although the invention has been described primarily in connection with special and preferred embodiments, it will be understood that it is capable of modification without departing from the scope of the invention. The following claims are intended to cover all variations, uses, or adaptations of the invention, following, in general, the principles thereof and including such departures form the present disclosure as come within known or customary practice in the field to which the invention pertains, or as are obvious to persons skilled in the field.

We claim:

1. A method of making encapsulated gas microspheres useful as an ultrasonic imaging agent comprising subjecting a mixture of an aqueous solution of a filmogenic protein and a pharmacologically acceptable insoluble gas to ultrasonic or mechanical cavitation in the absence of oxygen gas.

2. The method of claim 1, wherein said pharmacologically acceptable insoluble gas has a solubility in water at 25° C. of less than 0.01 mL/mL.

3. The method of claim 2, wherein said pharmacologically acceptable insoluble gas is selected from the group consisting of perfluoropropane, perfluoroethane, sulfur hexafluoride, perfluorobutane and perfluoromethane.

4. The method of claim 1, wherein said filmogenic protein is albumin.

5. The method of claim 1, wherein the pharmacologically acceptable insoluble gas has a diffusivity in water at 25° C. is less than $4 \times 10^{-5}$ cm$^2$/sec.

6. The method of claim 1 wherein said filmogenic protein is human serum albumin and the pharmacologically acceptable insoluble gas is perfluoropropane.

7. The method of claim 1, wherein said ultrasonic or mechanical cavitation takes place in an apparatus that is closed to the atmosphere.

* * * * *